United States Patent [19]

Yang et al.

[11] Patent Number: 5,520,981
[45] Date of Patent: May 28, 1996

[54] MAGNETIC RECORDING DISK WITH OVERCOAT THICKNESS GRADIENT BETWEEN A DATA ZONE AND A LANDING ZONE

[75] Inventors: Ming M. Yang, San Jose; James L. Chao, Milpitas; Michael A. Russak, Los Gatos, all of Calif.

[73] Assignee: HMT Technology Corporation, Fremont, Calif.

[21] Appl. No.: 427,337

[22] Filed: Apr. 24, 1995

[51] Int. Cl.$^6$ ................................................ G11B 5/82
[52] U.S. Cl. .................. 428/65.5; 428/156; 428/66.6; 428/336; 428/694 TP; 428/694 TC; 428/900; 360/135
[58] Field of Search ............................. 428/65.5, 66.6, 428/694 TP, 694 TC, 336, 156, 900; 360/135

[56] References Cited

U.S. PATENT DOCUMENTS

| | | | |
|---|---|---|---|
| 4,671,978 | 6/1987 | Kato et al. | 428/65 |
| 4,882,197 | 11/1989 | Matsudaira et al. | 427/8 |
| 5,045,165 | 9/1991 | Yamashita | 204/192.16 |
| 5,087,482 | 2/1992 | Kawai et al. | 427/129 |
| 5,167,096 | 12/1992 | Eltoukhy et al. | 51/281 SF |
| 5,227,211 | 7/1993 | Eltoukhy et al. | 428/64 |
| 5,324,593 | 6/1994 | Lal et al. | 428/610 |

FOREIGN PATENT DOCUMENTS 63-50917  3/1988  Japan.

OTHER PUBLICATIONS

Hsiao–chu, T., and Bogy, D. B., "Characterization of Diamondlike Carbon Films and Their Application as Overcoats on Thin–Film Media for Magnetic Recording," *J. Vac. Sci. Technol.* 5(6):3287–3312 (1987).

Marchon, B., et al., "Raman and Resistivity Investigations of Carbon Overcoats of Thin–Film Media: Correlations with Tribological Properties,", *J. Appl. Phys.* 69(8):5748–5750 (1991).

Marchon, B., et al., "Structure and Mechanical Properties of Hydrogenated Carbon Films Prepared by Magnetron Sputtering," *Transactions On Magnetics* 27(6):5160–5162 (1991).

*Primary Examiner*—Stevan A. Resan
*Attorney, Agent, or Firm*—Judy M. Mohr; Peter J. Dehlinger

[57] ABSTRACT

An improvement in a magnetic recording disc having a protective overcoat is described. The overcoat extends between an inner-diameter landing zone and a data zone and has a thickness in the landing zone of at least 135 Å and a thickness in the data zone of less than 90 Å.

9 Claims, 9 Drawing Sheets

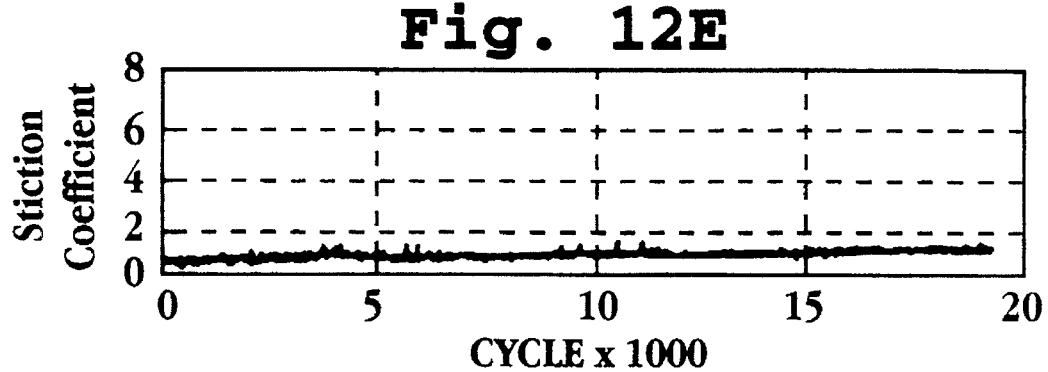
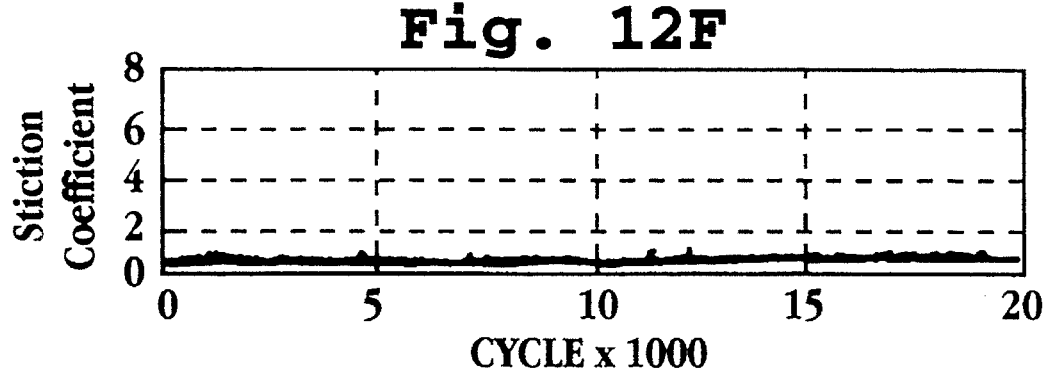

5,520,981

MAGNETIC RECORDING DISK WITH OVERCOAT THICKNESS GRADIENT BETWEEN A DATA ZONE AND A LANDING ZONE

FIELD OF THE INVENTION

The present invention relates to a protective overcoat in a magnetic recording disc, where the overcoat, in an inner-diameter landing zone of the disc, is thicker than in an outer-diameter data zone of the disc.

REFERENCES

Eltoukhy, A., et al., U.S. Pat. No. 5,167,096, issued Dec. 1, 1992.

Eltoukhy, A., et al., U.S. Pat. No. 5,227,211, issued Jun. 13, 1993.

BACKGROUND OF THE INVENTION

Magnetic recording media, for longitudinal and perpendicular recording, typically require an overcoat for wear and corrosion protection. The overcoat protects the magnetic thin-film layer at its inner-diameter landing zone from damage when the transducer head contacts the disc during a stop-start cycle. In the outer, data zone of the disc, the overcoat functions to protect the disc from environmental factors, such as oxidation or humidity, that can lead to corrosion.

The protection provided by the overcoat is related, in part, to its thickness, where a thicker overcoat offers better wear resistance than a thinner overcoat.

However, a thicker overcoat limits the flying height of a magnetic head on a disc, creating a spacing loss that in turn limits the recording density of the disc.

Therefore, it is an object of the invention to provide an overcoat that has adequate thickness to offer good wear resistance in the landing zone and also allow the head to fly closely to the medium to minimize spacing loss in the data zone.

SUMMARY OF THE INVENTION

In one aspect, the invention includes an improvement in a magnetic recording disc having a protective overcoat which extends between an annular, inner-diameter landing zone and a data zone of the disc. The improvement includes an overcoat having a thickness of at least 135 Å in the landing zone and less than 90 Å in the data zone.

The overcoat is composed of C, Zr, $ZrO_2$, Si, SiC or $SiO_2$, and, in a preferred embodiment, the overcoat is composed of C. The carbon overcoat may contain an element such as hydrogen or nitrogen.

In one preferred embodiment, the thickness of the overcoat in the landing zone is at least two times, and up to three times, the thickness of the overcoat in the data zone.

The landing zone and the data zone are separated by a boundary, and the thickness gradient of the overcoat may be either continuous or discontinuous across the boundary.

The medium, in another embodiment, includes a substrate having a greater surface roughness in a region corresponding to the disc's landing zone than in a region corresponding to the disc's data zone.

These and other objects and features of the invention will be more fully appreciated when the following detailed description of the invention is read in conjunction with the accompanying drawings.

BRIEF DESCRIPTION OF THE DRAWINGS

FIGS. 12A–12F are plots of stiction coefficient, in mu, against number of cycles in contact-start-stop experiments on magnetic recording discs having a carbon overcoat with thicknesses of 56 Å (FIG. 12A), 91 Å (FIG. 12B), 135 Å (FIG. 12C), 183 Å (FIG. 12D), 216 Å (FIG. 12E) and 330 Å (FIG. 12F).

DETAILED DESCRIPTION OF THE INVENTION

I. Protective Overcoat and Preparation

Figure 1:
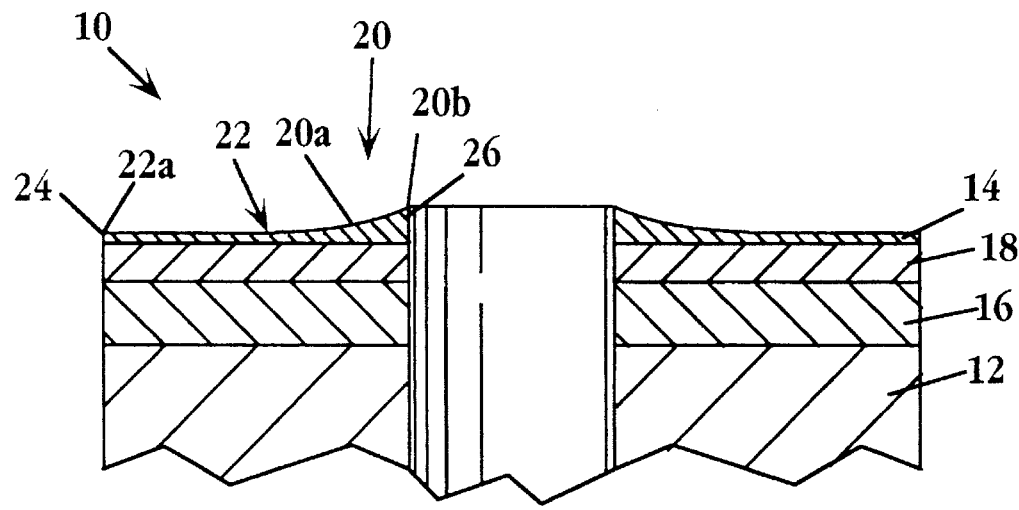
FIG. 1 is a sectional view of a thin-film magnetic disc having an overcoat formed in accordance with the present invention.

FIG. 1 shows in cross-sectional view a magnetic recording disc 10 composed of a base or substrate 12 and an overcoat 14, formed in accordance with the present invention. The disc also includes an under-layer 16 formed directly on the substrate and a magnetic thin-film layer 18 formed on the underlayer.

Disc 10 has an inner-diameter landing zone 20 where, as described above, the head contacts the disc during a start-stop cycle. An outer, data zone 22 extends from outer edge 20a of the landing zone to the outer diameter 24 of substrate 12.

According to an important feature of the invention, overcoat 14, which extends between an annular inner-diameter region 20b of the landing zone to the outer edge 22a of the data zone, has a greater thickness in the landing zone than in the data zone. The thickness in the landing zone is at least 135 Å and the thickness in the data zone is less than 90 Å. In a preferred embodiment, the thickness of the overcoat in the landing zone is at least two, and up to three, times the thickness of the overcoat in the data zone.

The substrate may be a textured substrate, such as a conventional surface-coated, textured aluminum substrate of the type commonly used for digital recording medium. Typically, the substrate is first plated with a selected alloy plating, such as a nickel/phosphorus plating, to achieve a requisite surface hardness, with the thickness of the plating being about 300–700 micro-inches. Alternatively, the substrate may be a textured glass or ceramic substrate.

In one embodiment of the invention, the substrate has a greater surface roughness in a region corresponding to the disc's landing zone than in a region corresponding to the disc's data zone. Disc substrates can be textured by a variety of methods, including laser texturing, sputter induced texturing, chemical etching or mechanical texturing, such as abrading or sanding. Each method is effective to create a roughened surface characterized by sub-micron surface irregularities. The roughened surface reduces stiction, i.e., the static friction between the disc and head, by reducing the surface contact between the two, particularly for start/stop cycles. A method for texturing a magnetic disc substrate is described in co-owned U.S. Pat. No. 5,167,096, which is incorporated by reference herein.

Conventional size substrates have outer diameters of 130 mm (5.25 inches), 95 mm (3.5 inches) or 65 mm (2.5 inches) with corresponding inner diameters of 40 mm (1.57 inches), 25 mm (0.98 inches) and 10 mm (0.79 inches), respectively. The inner and outer edges of the disc which define these diameters are indicated at 36, 24, respectively, in FIG. 1.

Underlayer 16 is preferably a sputtered chromium underlayer having a thickness between about 100–3,000 Å, more preferably between about 1,000–3,000 Å. Chromium-based alloys, that is an alloy containing at least about 50% chromium, such as CrV, CrGd and CrSi, may also be suitable, as may a tungsten underlayer.

Magnetic film layer 18 is preferably composed of a cobalt-based alloy and is deposited to a thickness of between 100–800 Å. By cobalt-based alloy is meant an alloy containing at least 50% cobalt. Exemplary binary alloys include Co/Cr or Co/Ni, and exemplary ternary, quaternary, and five-element alloys include Co/Cr/Ta, Co/Ni/Pt, Co/Cr/Pt, Co/Ni/Cr, Co/Cr/Pt/B, Co/Cr/Ta/Pt, Co/Ni/Cr/Pt, and Co/Cr/Ni/Pt/B.

Overcoat 14 is composed of a material giving wear-resistant, protective properties to the medium. Preferably, the overcoat is composed of C, Zr, $ZrO_2$, Si, SiC, or $SiO_2$, typically, carbon, which may include carbon produced by sputtering in an argon atmosphere containing nitrogen or hydrogen, for an overcoat containing hydrogen and/or nitrogen.

Figure 2:
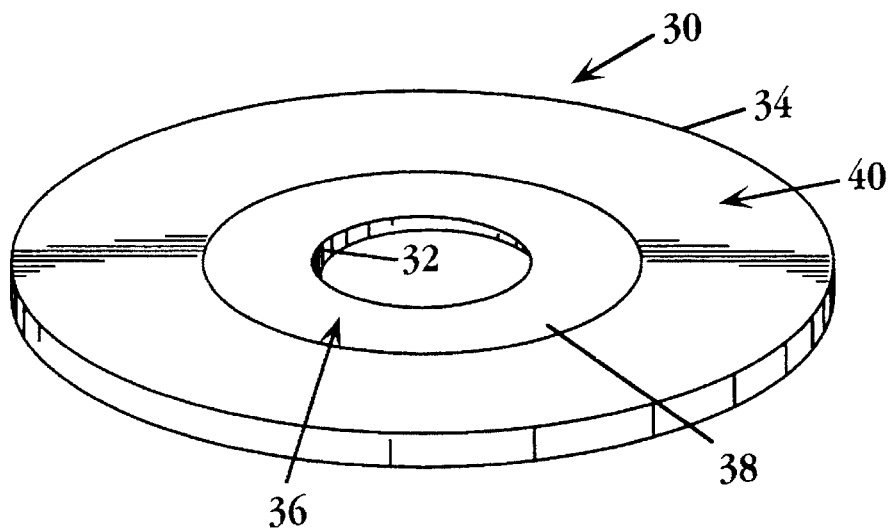
FIG. 2 shows in a magnetic recording disc, the landing zone and the data zone.

Turning now to FIG. 2, a magnetic recording disc having a landing zone and a data zone is shown. Seen here is an annular magnetic recording disc 30 of the type having a protective overcoat, as described above with respect to FIG. 1. Annular disc 30 has an inner diameter 32 and an outer diameter 34.

Adjacent the inner diameter is an annular, inner-diameter landing zone 36. In use with a magnetic head, the landing zone is the region where the head makes contact with the disc during start/stop cycles or other intermittent occurrences. In FIG. 2, the edge of the landing zone is indicated by line 38, which is the boundary between landing zone 36 and a data zone 40, where magnetic information is stored in the magnetic recording layer of the disc. For a disc having a 1.8 inch outer radius, the boundary is typically at about 0.8 inches, measured from the inner diameter edge, and the head lands at about a radius of 0.72 inches.

Figure 3:
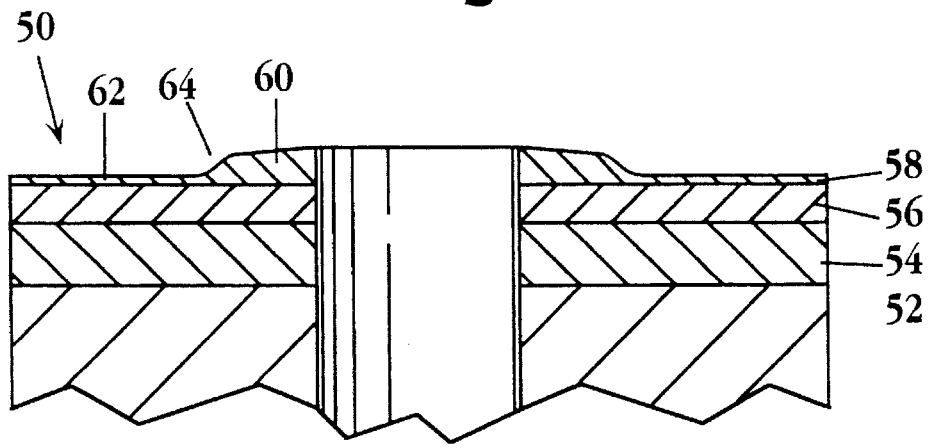
FIG. 3 shows a sectional view of a thin-film magnetic disc formed according to another embodiment of the invention, where the overcoat thickness decreases sharply across a boundary separating the landing zone and the data zone.

FIG. 3 shows a cross-sectional view of a magnetic recording disc 50, which is similar to that described in FIG. 2. Disc 50 includes a substrate 52, an underlayer 54, a magnetic recording layer 56 and a protective overcoat 58. The overcoat extends between annular inner-diameter landing zone 60 and data zone 62, which are separated by a boundary 64. The thickness of overcoat 58 across boundary 64, as shown in the embodiment of FIG. 3, is substantially discontinuous. That is, there is a sharp decrease in overcoat thickness across the boundary. For example, the overcoat thickness in the inner-diameter landing zone may be between 135–400 Å, more preferably between 150–300 Å. The overcoat may have a slight decrease in thickness across the landing zone. At the boundary between the landing zone and the data zone, the change in overcoat thickness is abrupt, as illustrated in the figure. The overcoat in the data zone has a thickness of between 30–135 Å, more preferably between 50–90 Å.

It will be appreciated that the thickness of the overcoat may also be continuous across the boundary between the landing zone and the data zone. In this embodiment, as shown in FIG. 1, the thickness of the overcoat decreases gradually and continually across the radius of the disc, on progressing from the inner diameter to the outer diameter. The overcoat thickness in the inner-diameter landing zone may be between 135–400 Å, more preferably between 150–300 Å, and the overcoat in the data zone has a thickness of between 30–135 Å, more preferably between 50–90 Å, where the change in thickness is continuous across the two zones.

In both of the described embodiments, where the thickness across the boundary separating the landing zone from the data zone is continuous or discontinuous, the overcoat in the landing zone is preferably at least about two times the thickness of the overcoat in the data zone.

Figure 4:
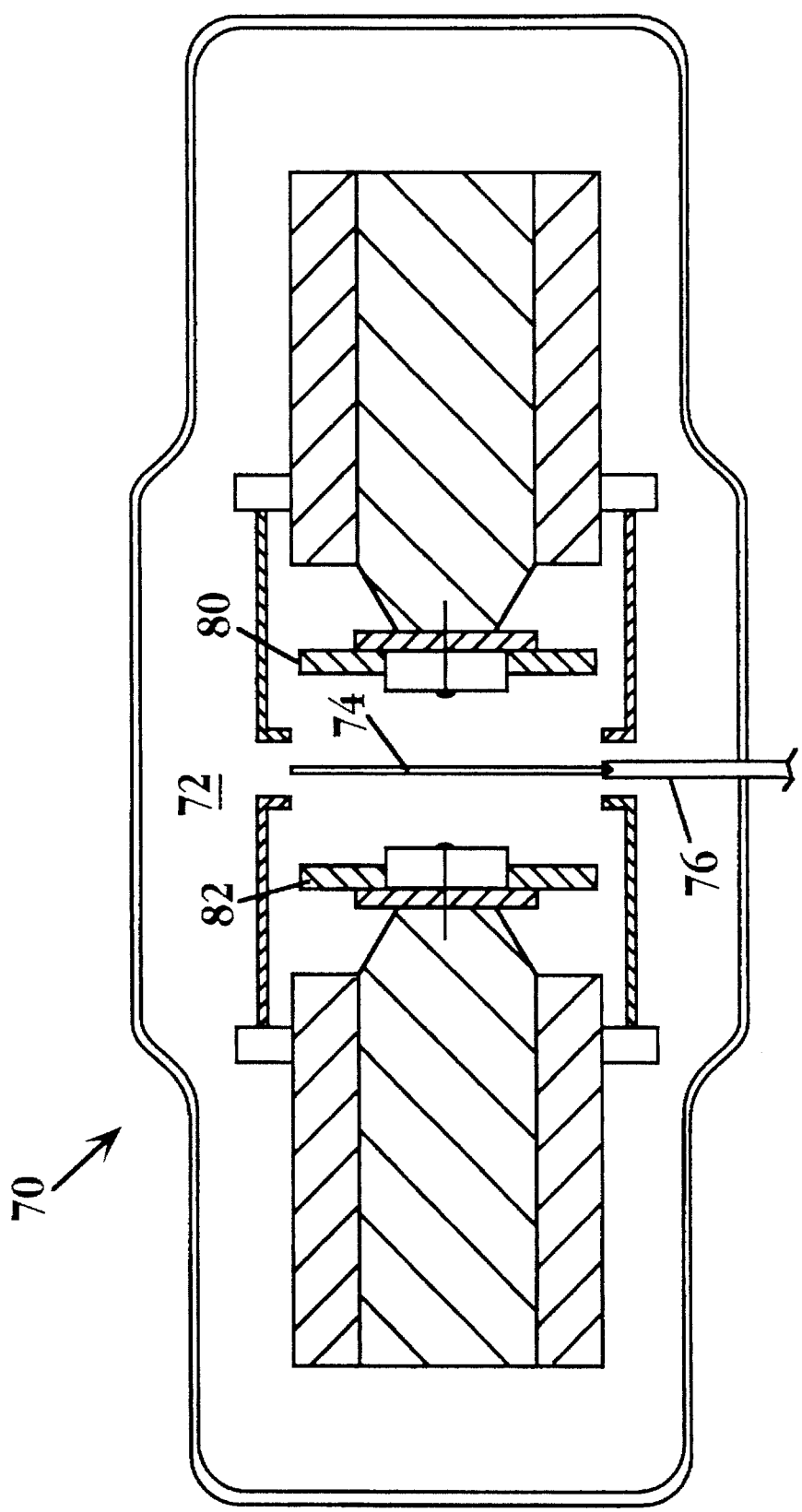
FIG. 4 is a schematic view of a sputtering chamber in a single-disc sputtering apparatus used in producing the disc shown in FIG. 1.

FIG. 4 shows, in simplified schematic view, a portion of a single-disc sputtering apparatus 70 which is used for producing the magnetic recording disc described above. The apparatus includes a plurality of sputtering chambers, such as chamber 72, at which sputtering or heating operations occur.

In a sputtering operation, a substrate, such as substrate 74, is carried on a pedestal 76 in a downstream direction, from an upstream heating station which has a plurality of infrared lights which are arrayed for heating both sides of a substrate, to a first sputtering station in which the underlayer is formed. The substrate is then carried to a second sputtering station in which the thin-film magnetic recording layer is formed.

The coated substrate is then carried to sputtering chamber 72 where the carbon overcoat is formed. Station 72 houses a pair of targets, such as graphite targets 80, 82, which are connected to a power supply in the apparatus to achieve a selected target voltage with respect to the disc. The sputtering voltage is typically adjusted to between 300–600 volts, giving a power level of between 0.5–4 kWatts.

The basic sputtering apparatus is preferably a single-disc system, commercially available from Varian/Intevac (Santa Clara, Calif.) or Leybald Heraeus (Germany). The apparatus may also be an in-line system, such as those available from Circuits Processing Apparatus (Fremont, Calif.), ULVAC (Japan), Leybald Heraeus (Germany), VACTEC (Boulder, Colo.), or Materials Research Corporation (Albany, N.Y.). These systems are double-sided, in-line, high-throughput machines having two interlocking systems, for loading and unloading.

In operation, the sputtering chambers are evacuated to pressures of about $10^{-7}$ Torr, and argon gas is introduced into the chambers to a final sputtering pressure of 2–20 mTorr. The underlayer and magnetic layers are formed conventionally on the substrate.

Figure 5A:
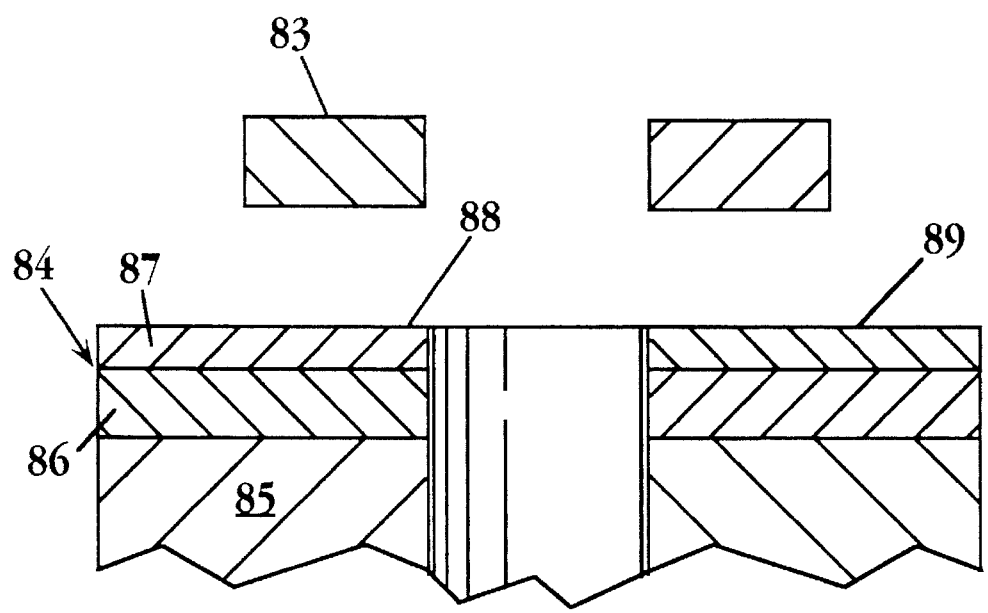
FIGS. 5A–5B are schematic views showing sputtering of an overcoat from a sputtering target onto a magnetic recording disc, where the target is smaller than the disc (FIG. 5A) and where a portion of the target is shielded (FIG. 5B)

In the embodiment of the invention shown in FIG. 1, the carbon overcoat has a continuous gradient in thickness across the diameter of the disc. The thickness gradient is accomplished by sputtering from targets that are smaller in diameter than the outer diameter of the substrate. This is seen best in FIG. 5A, where target 83 is shown positioned above disc 84. Disc 84 includes a substrate 85, an underlayer 86 and a magnetic thin-film layer 87. Target 83 has a smaller outer diameter than disc 84, so that during sputtering, more material is deposited on the region of the disc which is positioned directly below the target, indicated at 88 in the figure, and corresponding to the landing zone of the disc. This sputtering configuration leads to a substantially continuous thickness gradient across the landing zone/data zone boundary.

Figure 5B:
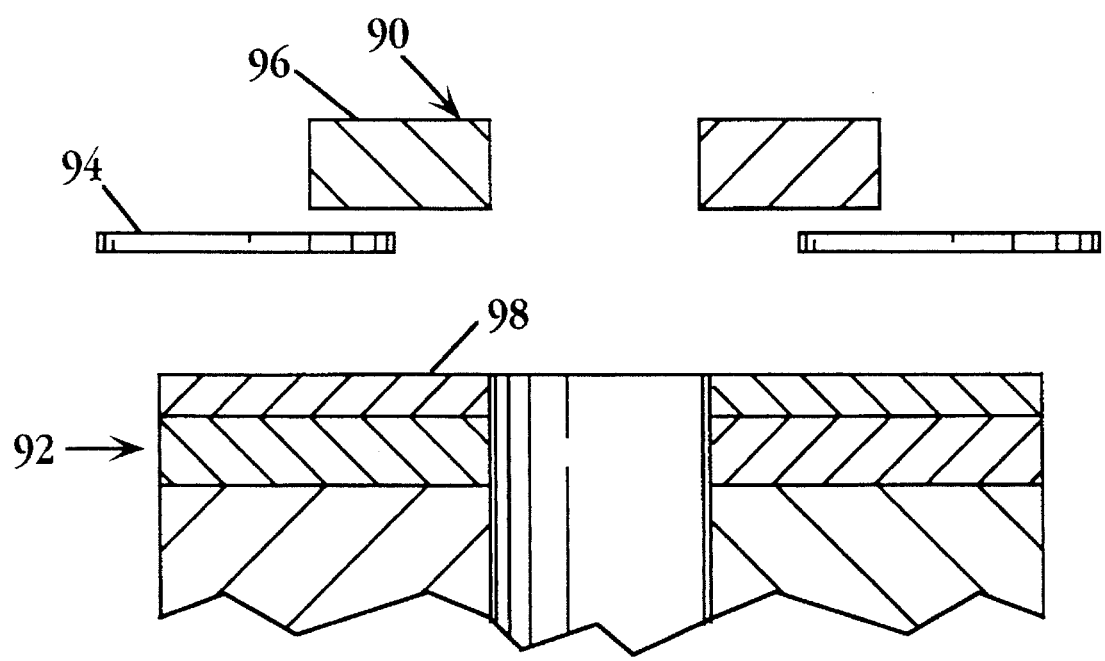

FIG. 5B illustrates a sputtering method for forming an overcoat having a discontinuous overcoat thickness across the boundary separating the landing zone and the data zone. Target 90 is positioned above disc 92 for deposition of an overcoat. A baffle or shield 94 is positioned between the target and the disc, so that little material is sputtered from the outer region 96 of the target onto the disc. During a sputtering operation, material is deposited onto the disc primarily in the inner-diameter landing zone 98 of the disc.

The sputtering method of FIG. 5B may be preceded by deposition of a carbon overcoat having a continuous thickness of about 30–80 Å. The disc is then carried to a sputtering station where a baffle prevents deposition of material onto the outer, data zone of the disc, as described in FIG. 5B. Material is deposited in the inner-diameter landing zone, creating a carbon overcoat that is thicker in the landing zone than in the data zone.

In the embodiment of the invention where the overcoat contains hydrogen or nitrogen, an initial carbon layer is generally deposited prior to the doped-carbon layer. The initial carbon layer, which may be deposited uniformly or with a gradient, reduces diffusion of the hydrogen or nitrogen in the overlying doped-carbon layer into the magnetic recording layer. Diffusion of hydrogen or nitrogen may effect the magnetic recording properties of the disc.

Figure 6A:
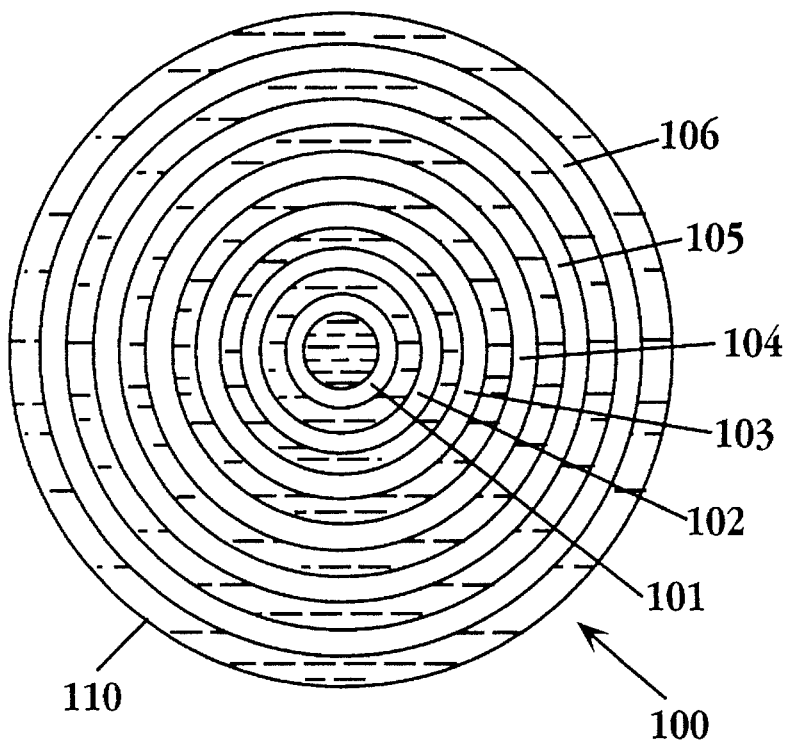
FIG. 6A shows in plan view an assembly of concentrically arranged magnetic coils for use adjacent a sputtering target to achieve a layer thickness gradient.
Figure 6B:
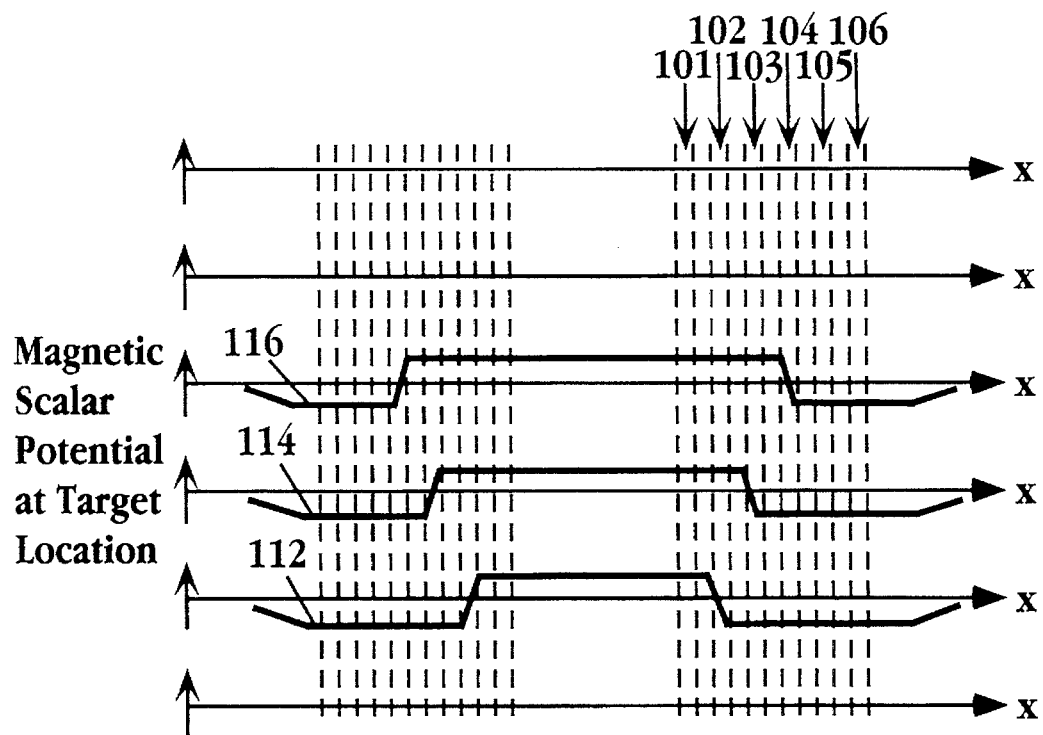
FIG. 6B shows the magnetic scalar potential at locations on a target adjacent the magnetic coil assembly of FIG. 6A, when selected magnetic coils are energized.

FIGS. 6A and 6B illustrate another method of selectively concentrating a sputtering plasma in order to deposit a layer, e.g. an overcoat, with a gradient in thickness. FIG. 6A shows an assembly 100 of concentrically arranged electromagnetic coils, indicated by numbers 101–106 in the figure. Such an assembly is commercially available from Cathode Technology Corporation (San Jose, Calif.). The coils are adjacent a sputtering target 110, positioned "below" the coils in the figure. Each electromagnetic coil can be independently energized by power sources, not shown in the figure.

In use, a pair of coils in assembly 100 is energized to focus the sputtering plasma when the target is ignited. For example, coils 101 and 102 are energized so that coil 101 is opposite in polarity from coil 102. A closed magnetic loop is generated about the target region that corresponds to the position of coils 101 and 102. The sputtering plasma is concentrated in the magnetic loop region, effectively increasing, in that region, the deposition rate of material onto a substrate positioned close to the target. The increased deposition rate in the inner-diameter region of the substrate corresponds to the smaller diameter erosion zone in the target and results in a sputtered layer having a thickness that is greater in the inner diameter landing zone of the disc than in the outer, data zone.

FIG. 6B shows the magnetic scaler potential in relation to position on a target when certain coils in the assembly are energized. Line 112 indicates the magnetic potential when coil 102 is energized, line 114 corresponds to coil 103 being energized, and line 116 corresponds to coil 104 being energized. As can be seen, when the outer coils (104–106) are energized, the magnetic potential encompasses a greater portion of the sputtering target, effectively increasing the deposition rate over the encompassed portion. In this way, the thickness gradient of a layer deposited on a substrate can be tailored.

Table 1, in the second column, shows the thickness of a nonmagnetic film deposited by sputtering from a target when coils 101 and 102 (FIG. 6A) were energized. In an inner-diameter region of the disc, 0.8 inches, the thickness of the film was 1950 Å. At the outer diameter of the disc, 1.6 inches, the film thickness was 1140 Å. The thicker film in the inner-diameter region results from the increased deposition rate in the region corresponding to the closed magnetic loop generated when the inner coils are energized.

The data in the last column of Table 1 is for a magnetic film deposited when the outer coils 105 and 106 (FIG. 6A) were energized. The thickness of the deposited layer was uniform across the disc, as seen by comparing the thicknesses at the disc radial positions of 0.8, 1.2 and 1.6 inches.

TABLE 1

| Radial Disc Position (inches) | Film Thickness (Å) | |
|---|---|---|
| | Inner Coils 101 and 102 Energized | Outer Coils 105 and 106 Energized |
| 0.8 | 1950 | 500 |
| 1.2 | 1750 | 512 |
| 1.6 | 1140 | 502 |

In other experiments performed in support of the invention, a carbon overcoat was deposited onto a disc having an underlayer and a magnetic recording layer. The overcoat was deposited at a target power of 2.5 kW and a sputtering pressure of 5–20 mTorr. The overcoat was deposited by the method described with respect to FIG. 5A, where the graphite target has a smaller diameter than the outer diameter of the disc.

Figure 7:
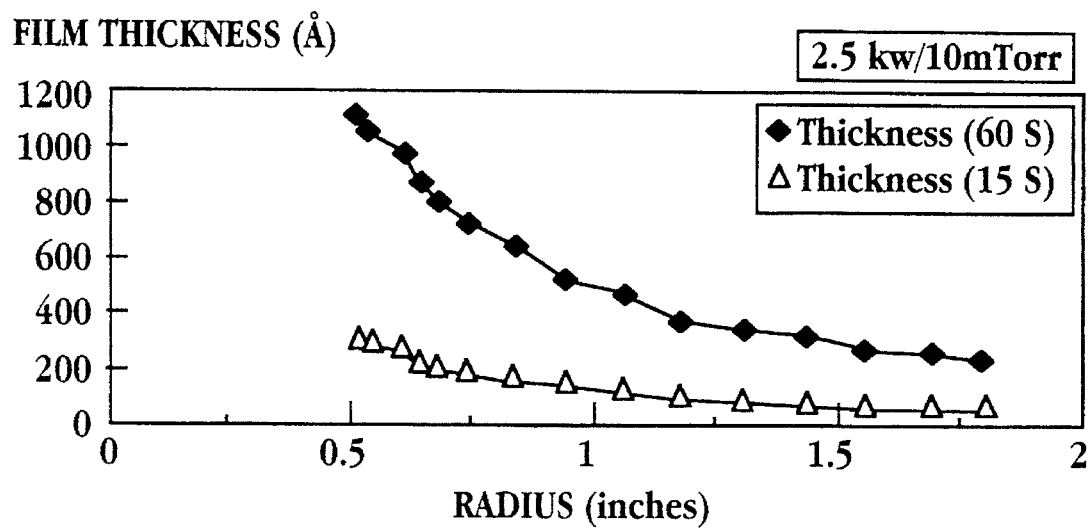
FIG. 7 shows a plot of film thickness in Å as a function of position on a magnetic recording disc, measured as disc radius in inches, for a carbon overcoat deposited by sputtering from a graphite target for 15 seconds (Δ) and for 60 seconds (♦)

FIG. 7 shows the thickness of the overcoat as a function of disc radius, in inches, for an overcoat deposited by sputtering for 15 seconds (Δ) and for 60 seconds (♦). The thickness of the overcoat was measured using a TENCOR™ which uses a stylus to measure a change in thickness. The overcoat deposited by sputtering for 60 seconds has a thickness across the landing zone from 1100 Å at 0.5 inches to about 600 Å at 0.8 inches. The thickness is continuous across the boundary of the landing zone and the data zone, where the thickness decreases from about 600 Å to about 300 Å. The overcoat deposited by sputtering for 15 seconds has a landing zone thickness from about 275 Å to about 150 Å at the boundary separating the landing zone from the data zone at 0.8 inches. Across the data zone, the thickness of the overcoat decreases from 150 Å to about 90 Å.

As will be described below, an overcoat formed according to the invention to have a thickness in the landing zone that is greater than that in the data zone, is effective to improve the wear resistance of the disc and at the same time to improve the magnetic recording properties.

In one embodiment of the invention, the overcoat is formed of carbon and contains nitrogen or hydrogen. A nitrogen- or hydrogen-containing carbon overcoat is formed by sputtering under an atmosphere containing nitrogen or hydrogen. The nitrogen or hydrogen containing gas, such as methane or other hydrocarbon gas, is introduced to the sputtering chamber from a gas source external to the chamber. The desired mole percentages of gases in the chamber may be controlled by suitable valving apparatus which control the flow rate at which gases are introduced into the chamber. Alternatively, the desired gas may be premixed with the inert sputtering gas, typically argon, and admitted to the chamber from a single, mixed gas source. Preferred gas mixtures for forming nitrogen-containing and hydrogen containing carbon overcoats are described in U.S. Pat. No. 5,227,211, which is incorporated by reference herein, include 10–50 percent hydrogen or hydrocarbon containing gas with the balance argon, or 5–50 mole percent nitrogen gas, with the balance argon.

IV. Magnetic Recording Medium Properties

In experiments performed in support of the invention, magnetic recording discs were fabricated by depositing on a nickel-plated aluminum substrate a chromium underlayer and a CoCrTa magnetic recording layer. A carbon overcoat was deposited by sputtering as described in FIG. 5A from a graphite target.

Figure 8:
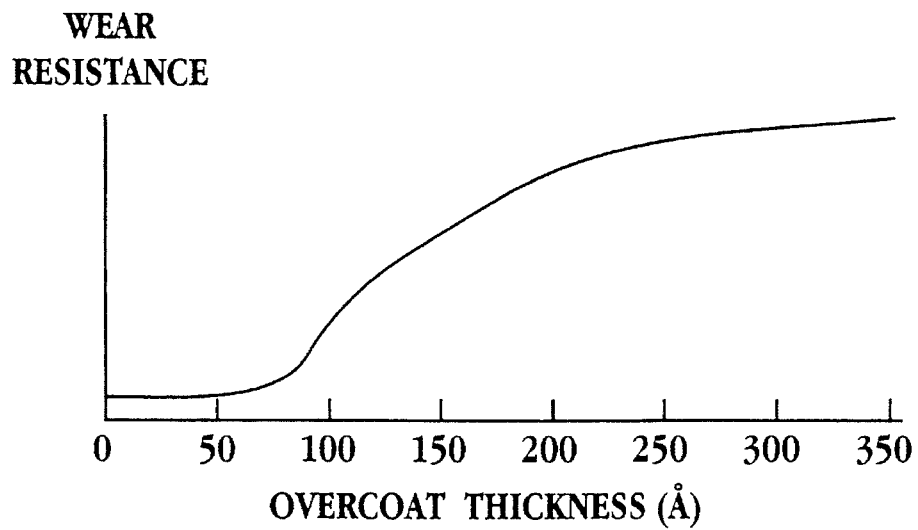
FIG. 8 illustrates the relationship between wear resistance of the magnetic recording disc and thickness of the overcoat.

FIG. 8 illustrates the relationship between wear resistance of a magnetic recording disc and thickness of the overcoat. In the experiments described below, an overcoat of at least about 50 Å is required for adequate wear resistance. As the thickness of the overcoat increases, the wear resistance improves, to a thickness of about 300 Å, after which the improvement in wear resistance begins to plateau.

FIGS. 9–11 are simulations showing the relationship between a given magnetic recording property, such as resolution (FIG. 9), pulse width (PW50, FIG. 10) and peak-to-peak amplitude (FIG. 11), and thickness of the overcoat.

Figure 9A:
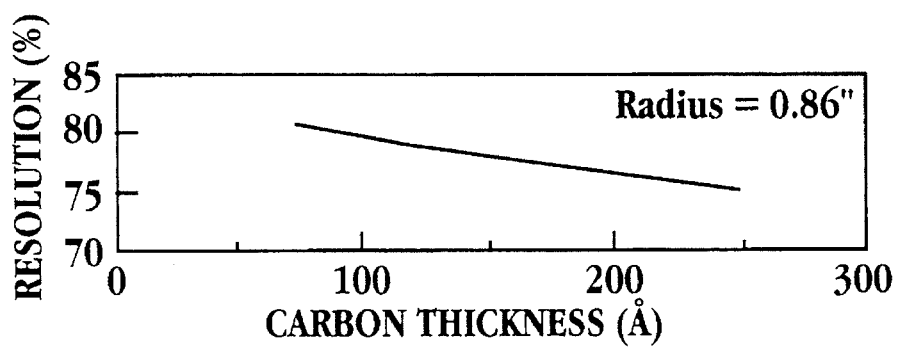
FIGS. 9A–9B are simulations showing the relationship between resolution and thickness of the overcoat, measured at an inner-diameter region just outside the landing zone (FIG. 9A) and at an outer-diameter region in the data zone (FIG. 9B)
Figure 9B:
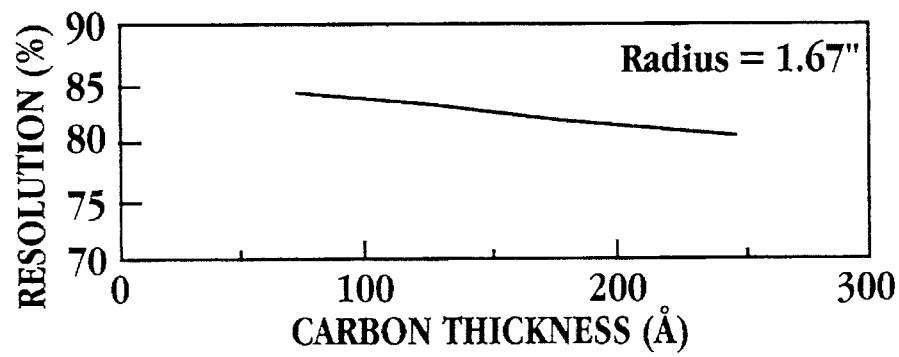

FIG. 9A shows that resolution, which is a defined as the ratio of the high-frequency track average amplitude divided by the low frequency track amplitude, decreases from about 81% to 75%, as the thickness of the overcoat increases from 90 to 280 Å. A similar decrease in resolution is seen (FIG. 9B) at a radius of 1.67 inches, in the data zone of the disc.

Figure 10A:
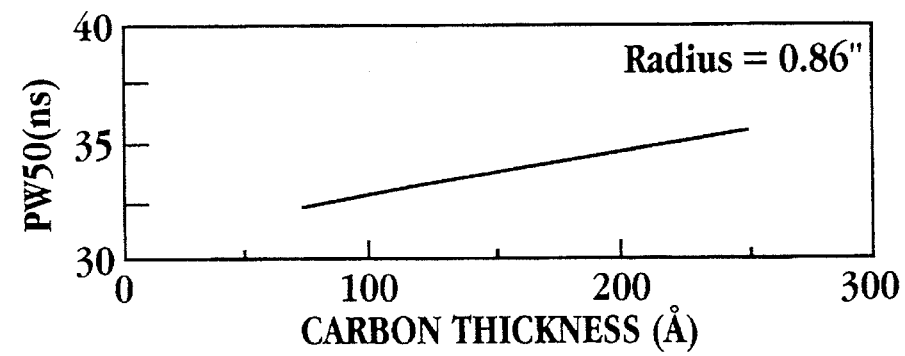
FIGS. 10A–10B are simulations showing the relationship between and pulse-width and thickness of the overcoat, measured at an inner-diameter region just outside the landing zone (FIG. 10A) and at an outer-diameter region in the data zone (FIG. 10B)
Figure 10B:
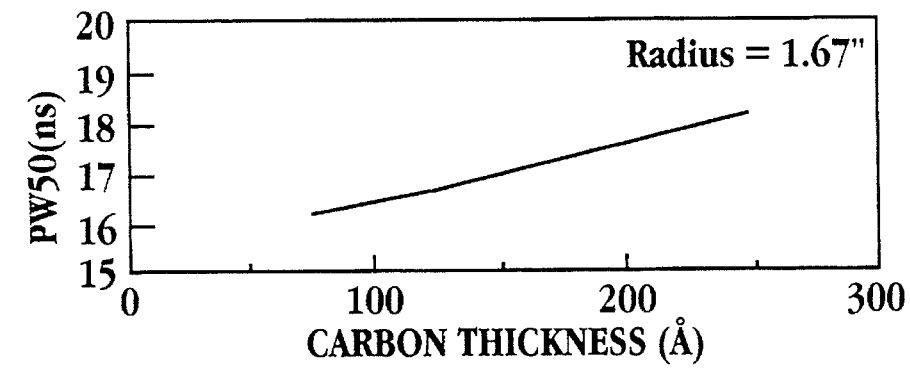

FIGS. 10A–10B show the increase in pulse-width with increasing thickness of the overcoat. Pulse width is a parameter that is generally inversely related to coercivity, and the higher the coercivity the narrower a bit can be written and sensed. The increasing pulse width is observed at both the inner diameter radius of 0.86 inches (FIG. 10A) and at 1.67 inches (FIG. 10B).

Figure 11A:
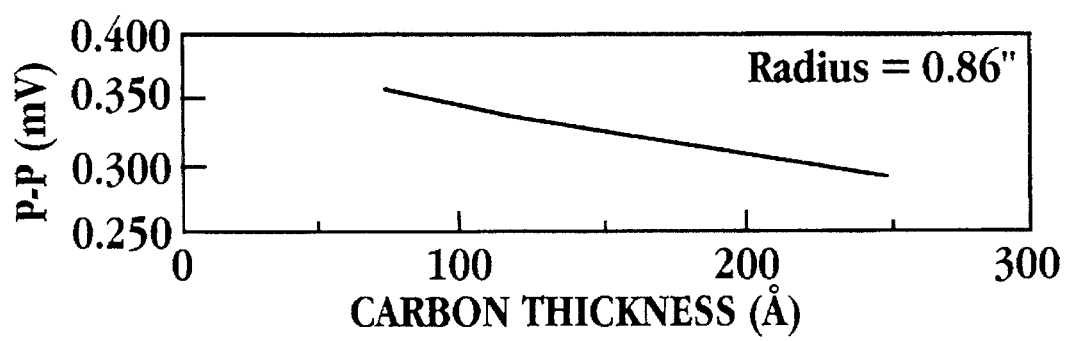
FIGS. 11A–11B are simulations showing the relationship between and peak-to-peak amplitude, in mV, and thickness of the overcoat, measured at an inner-diameter region just outside the landing zone (FIG. 11A) and at an outer-diameter region in the data zone (FIG. 11B)
Figure 11B:
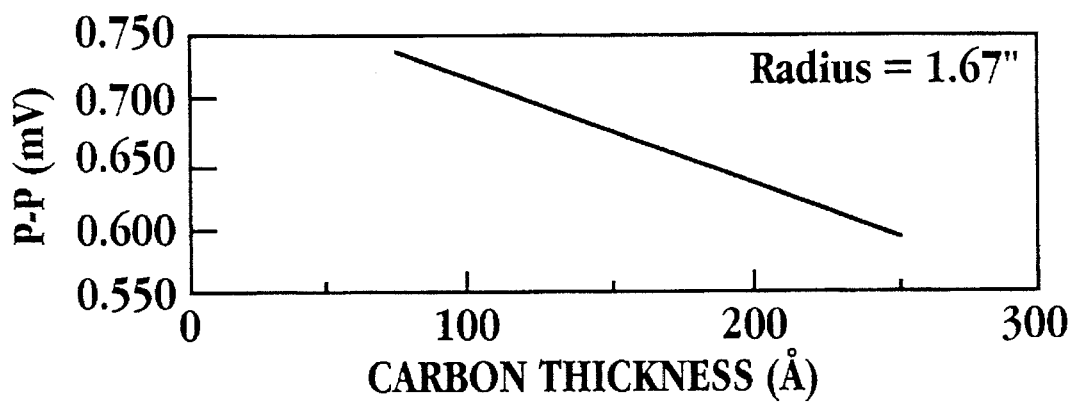

Peak-to-peak amplitude, or signal amplitude, as a function of carbon overcoat thickness is shown in FIGS. 11A–11B, measured at 0.86 inches corresponding to an inner-diameter region just outside the landing zone (FIG. 11A) and at 1.67 inches, corresponding to an outer-diameter region in the data zone (FIG. 11B). At both positions, the peak-to-peak amplitude decreases as the thickness of the carbon overcoat increases.

In general, the simulations of FIGS. 9–11 indicate that for enhanced recording properties, a thin carbon overcoat is desirable. Resolution and peak-to-peak amplitude both decrease as the thickness of the overcoat increases. Pulse width increases with increasing overcoat thickness. At the same time, as evidenced by the data below, a thick overcoat is desired for enhanced wear resistance.

Figure 12A:
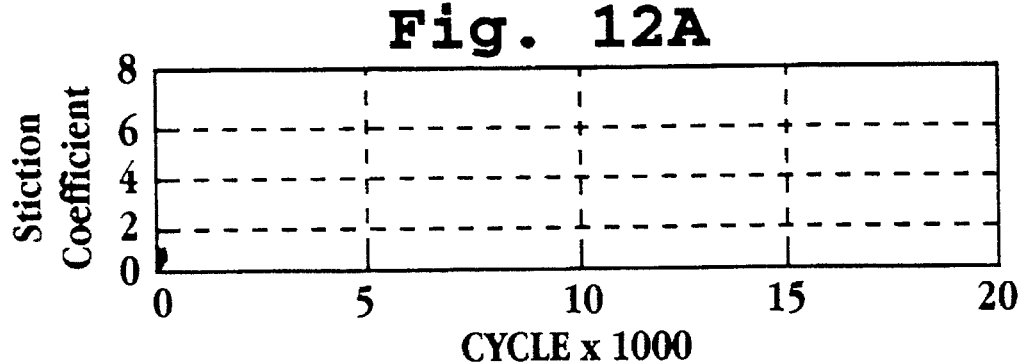

FIGS. 12A–12F are plots of stiction coefficient against number of cycles in contact-start-stop (CSS) experiments on magnetic recording discs having a carbon overcoat with thicknesses of 56 Å (FIG. 12A), 91 Å (FIG. 12B), 135 Å (FIG. 12C), 183 Å (FIG. 12D), 216 Å (FIG. 12E) and 330 Å (FIG. 12F).

In the CSS tests shown in FIGS. 12A–12F, media were formed by depositing an underlayer, a magnetic recording layer and a carbon overcoat to a desired thickness on a 95 mm Al/NiP substrate. The tests were performed at ambient temperature and relative humidity. A thin film head (Applied Magnetics Corporation, LCI, 70%) with 6.5 gram load was used for testing on 95 mm disks at radius of 0.78 inches.

Figure 12B:
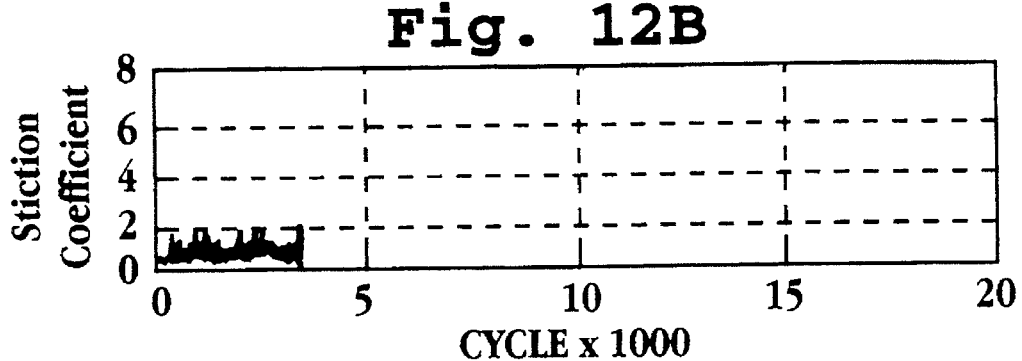
Figure 12C:
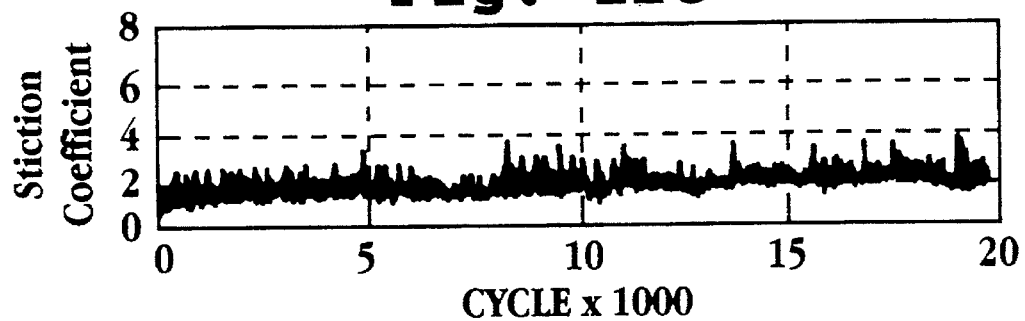
Figure 12D:
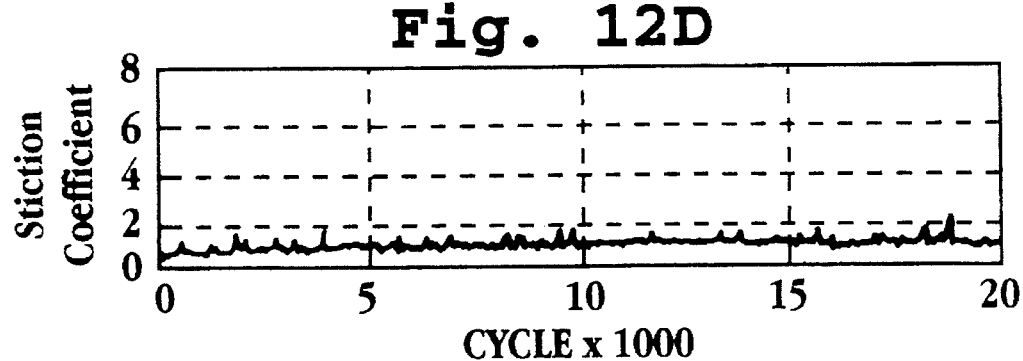

FIG. 12A shows that a carbon overcoat having a thickness of 56 Å is quickly worn away, offering little protection and wear resistance. An overcoat of 91 Å offers a lifetime of about 3,000 CSS cycles (FIG. 12B). A carbon overcoat of 135 Å or greater, (FIGS. 12C–12F) offer excellent wear resistance, having a lifetime of greater than 20,000 cycles. As seen in FIG. 12D, a carbon overcoat having a thickness of 183 Å has low stiction and excellent modulation. Thicker carbon overcoats also give better reproducibility in stiction.

From the foregoing it can be appreciated how various objects and features of the invention are met. A magnetic recording disc having an overcoat that is greater in thickness in the landing zone than in the data zone achieves excellent wear resistance and enhanced magnetic recording properties. The overcoat of the present invention is preferably formed of carbon, and has a thickness in the landing zone of at least 135 Å and a thickness in the data zone of less than about 90 Å.

Although the invention has been described with respect to particular embodiments, it will be apparent to those skilled in the art that various changes and modifications can be made without departing from the invention. For example, where it is desired to produce a flat, i.e., planar, disc surface but still having an overcoat thickness gradient, one of the underlying layers, e.g., the chromium underlayer, may be formed with a thinner inside, thicker outside gradient, such that the greater inner diameter overcoat thickness serves to "level" the landing-zone region of the disc.

It is claimed:

1. In a magnetic recording disc having a protective overcoat extending between an annular, inner-diameter landing zone and a data zone, an improvement comprising:
    an overcoat thickness of at least 135 Å in the landing zone and less than 90 Å in the data zone.

2. The medium of claim 1, wherein the landing zone and the data zone are separated by a boundary, and the thickness of the overcoat is continuous across said boundary.

3. The medium of claim 1, wherein the landing zone and the data zone are separated by a boundary, and the thickness of the overcoat is discontinuous across said boundary.

4. The medium of claim 1, wherein the medium includes a substrate having a greater surface roughness in a region corresponding to the disc's landing zone than in a region corresponding to the disc's data zone.

5. The medium of claim 1, wherein said overcoat is composed of a material selected from the group consisting of C, Zr, $ZrO_2$, Si, SiC and $SiO_2$.

6. The medium of claim 5, wherein said overcoat is composed of C.

7. The medium of claim 6, wherein said carbon overcoat contains one element selected from the group consisting of hydrogen and nitrogen.

8. The medium of claim 1, wherein said thickness of the overcoat in the landing zone is at least two times the thickness of the overcoat in the data zone.

9. The medium of claim 1, wherein said thickness of the overcoat in the landing zone is at least three times the thickness of the overcoat in the data zone.

* * * * *